(12) United States Patent
Nuechterlein et al.

(10) Patent No.: US 10,507,638 B2
(45) Date of Patent: Dec. 17, 2019

(54) REACTIVE ADDITIVE MANUFACTURING

(71) Applicant: Sinter Print, Inc., Erie, CO (US)

(72) Inventors: Jacob S. Nuechterlein, Erie, CO (US); Jeremy Joseph Iten, Erie, CO (US)

(73) Assignee: Elementum 3D, Inc., Erie, CO (US)

( * ) Notice: Subject to any disclaimer, the term of this patent is extended or adjusted under 35 U.S.C. 154(b) by 527 days.

(21) Appl. No.: 15/070,514

(22) Filed: Mar. 15, 2016

(65) Prior Publication Data
US 2016/0271878 A1    Sep. 22, 2016

Related U.S. Application Data

(60) Provisional application No. 62/134,190, filed on Mar. 17, 2015.

(51) Int. Cl.
*B29C 67/00* (2017.01)
*B33Y 10/00* (2015.01)

(52) U.S. Cl.
CPC ................... *B33Y 10/00* (2014.12)

(58) Field of Classification Search
CPC ............... B22F 3/23; B29C 64/165
See application file for complete search history.

(56) References Cited

U.S. PATENT DOCUMENTS

| | | |
|---|---|---|
| 4,710,348 A | 12/1987 | Brupbacher et al. |
| 5,156,697 A | 10/1992 | Bourell et al. |
| 5,182,170 A | 1/1993 | Marcus et al. |
| 5,472,649 A | 12/1995 | Chang et al. |
| 5,510,066 A * | 4/1996 | Fink ........................ B29C 64/40 156/242 |

(Continued)

FOREIGN PATENT DOCUMENTS

| | | |
|---|---|---|
| EP | 0764487 A1 | 3/1997 |
| JP | H10-088201 | 4/1998 |

(Continued)

OTHER PUBLICATIONS

Gu, D.D. et al., "Laser Additive Manufacturing of Metallic Components: Material, Processes and Mechanisms," International Materials Reviews, 2012, vol. 57, No. 3, pp. 133-164. 2012 Institute of Materials, Minerals and Mining and ASM International Published by Maney for the Institute and ASM International DO1 10.1179/1743280411Y.0000000014.

(Continued)

*Primary Examiner* — James Sanders
(74) *Attorney, Agent, or Firm* — Fennemore Craig, P.C.

(57) ABSTRACT

An additive manufacturing method may involve: Providing a first and a second material, the second material capable of reacting with the first material to form a reaction product; forming at least the first material into a first layer; subjecting at least a portion of the first layer to energy in the presence of the second material, the energy being sufficient to initiate a reaction between at least the first and second materials to form a portion of the article, the portion of the article comprising the reaction product; forming a second layer of at least the first material on the first layer; and subjecting at least a portion of the second layer to energy in the presence of the second material, the energy being sufficient to initiate a reaction between the first and second materials to form an additional portion of the article.

19 Claims, 4 Drawing Sheets

(56) References Cited

U.S. PATENT DOCUMENTS

| | | | |
|---|---|---|---|
| 6,063,323 A | 5/2000 | Fuls et al. | |
| 2004/0137228 A1 | 7/2004 | Monsheimer et al. | |
| 2013/0256953 A1 | 10/2013 | Teulet | |
| 2013/0307201 A1 | 11/2013 | McEnerney | |
| 2014/0227123 A1 | 8/2014 | Gunster et al. | |
| 2014/0298730 A1 | 10/2014 | Egan | |
| 2015/0014881 A1* | 1/2015 | Elsey | B33Y 10/00 264/219 |
| 2015/0321255 A1* | 11/2015 | Colin | B22F 3/1055 419/55 |
| 2016/0207108 A1* | 7/2016 | Daum | B29C 64/209 |

FOREIGN PATENT DOCUMENTS

| | | |
|---|---|---|
| JP | 2001-277368 | 10/2001 |
| JP | 2011-202165 | 10/2011 |
| JP | 2012-506799 | 3/2012 |
| JP | 2013-241320 | 12/2013 |
| WO | 9210343 A1 | 6/1992 |
| WO | 2009072935 A1 | 6/2009 |
| WO | 2013030064 A1 | 3/2013 |
| WO | 2015030879 A1 | 3/2015 |

OTHER PUBLICATIONS

Slocombe, A. et al., "Selective Laser Sintering of TiC—$Al_2O_3$ Composite with Self-Propagating High-Temperature Synthesis," Journal of Materials Processing Technology 118 (2001), pp. 173-178. Manufacturing Division, Department of Mechanical Aerospace and Manufacturing Engineering, University of Manchester Institute of Science and Technology (UMIST), P.O. Box 88, Manchester M60 1QD, United Kingdom, www.elsevier.com/locate/jmatprotec.

Dadbakhsh, Sasan et al., "Effect of Layer Thickness in Selective Laser Melting on Microstructure of Al/5 wt.%$Fe_2O_3$ Powder Consolidated Parts," The Scientific World Journal, vol. 2014, Article ID 106129, 10 pages, Hindawi Publishing Corporation, http://dx.doi.org/10.1155/2014/106129.

Australian Examination Report No. 1 for Standard Patent Application, dated Jul. 12, 2018, Australian Patent Application No. 2016233423, corresponding to PCT/US2016/22540, 5 pages.

Canadian Examination Report, dated Aug. 2, 2018, Canadian Patent Application No. 2,977,288, corresponding to PCT/US2016/22540, 13 pages.

Supplementary Partial European Search Report for Europe Patent Application No. 16765609.9, corresponding to PCT/US2016/022540, dated Oct. 10, 2018, 13 pages.

Examination Report No. 2 for Standard Patent Application for Australia Patent Application No. 2016233423, corresponding to PCT/US2016/022540, dated Nov. 5, 2018, 5 pages.

PCT Search Report and Written Opinion for corresponding PCT Application No. PCT/US2016/022540, dated Jun. 3, 2016, 14 pages.

Extended European Search Report, European Patent Application No. 16765609.9, dated Jan. 14, 2019.

Japanese First Office Action, Japanese Patent Application No. 2017-568009, dated Jan. 15, 2019.

Chinese First Office Action, Chinese Patent Application No. 201680025180.6, dated Feb. 25, 2019.

Australian Notice of Acceptance, Australian Patent Application No. 2016233423, dated Mar. 5, 2019.

Canadian Examination Report, dated Apr. 2, 2019, for Canadian Patent Application No. 2977288, 9 pages.

\* cited by examiner

REACTIVE ADDITIVE MANUFACTURING

CROSS-REFERENCE TO RELATED APPLICATION

This application claims the benefit of U.S. Provisional Patent Application No. 62/134,190, filed on Mar. 17, 2015, which is hereby incorporated herein by reference for all that it discloses.

TECHNICAL FIELD

The present invention relates to additive manufacturing general and more particularly to methods and systems for performing additive manufacturing with reactive materials.

BACKGROUND

Additive manufacturing techniques have been known for decades and are currently used to produce a wide range of parts and articles suitable for any of a wide range of applications. The most common additive manufacturing processes may be grouped into three main categories: Powder bed sintering/melting, extrusion, and directed energy deposition by jetting/wire feed. One type of powder bed sintering/melting technique, which may be referred to as selective laser sintering/melting or direct metal laser sintering, utilizes a laser beam directed energy source to trace a design in a single layer of a powdered material. The heat from the laser sinters or melts the traced design into a solid piece with the thickness of that layer. A suitable material feed system may dispense another layer of powder on top of the layer just sintered. The process is then repeated until a three dimensional object is formed. However, the energy required to form each layer of material restricts the production speed and increases the cost of the equipment needed to produce an object, with ceramic materials typically requiring more energy than do metals, which in turn require more energy than do plastics.

Another process for forming articles is reaction synthesis. Reaction synthesis is a chemical process that can be used to form sintered materials much more rapidly than is possible with conventional sintering processes. A typical reaction synthesis process involves the mixing together of two or more reactants of dissimilar chemistry, typically in powder form. A die press may be used to compact the mixed powders, forming a compacted article or powder compact. Alternatively, a mold or crucible may be used to contain the powder mixture. Heat may then be applied to initiate a chemical reaction among the constituents. The process is often exothermic and results in the formation of one or more new phases. For example, the heat from a furnace or a flame can initiate a reaction in a mixture of titanium and carbon powder. The combination reaction releases heat and forms a sintered ceramic phase of titanium carbide. The heat produced by this reaction spreads to the powders around it, causing the reaction to propagate through any reactants present. Some such processes involve the addition of one or more inert species, often referred to as diluents, to control the reaction by absorbing heat.

Reaction synthesis techniques have been used to produce many types of materials including ceramics, metals, intermetallics, polymers, and composites. However, most reaction synthesis techniques require extensive processing steps including the design and fabrication of a die or mold and typically can only be used to produce articles of simple shapes with limited detail, thereby limiting such processes.

SUMMARY OF THE INVENTION

One embodiment of an additive manufacturing method of producing an article, may involve: Providing a first material; providing a second material, the second material capable of reacting with the first material to form a reaction product; forming at least the first material into a first layer; subjecting at least a portion of the first layer to energy in the presence of the second material, the energy being sufficient to initiate a reaction between the first and second materials to form a portion of the article, the portion of the article comprising the reaction product; forming a second layer of at least the first material on the first layer; and subjecting at least a portion of the second layer to energy in the presence of the second material, the energy being sufficient to initiate a reaction between the first and second materials to form an additional portion of the article.

Another embodiment of an additive manufacturing method of producing an article may involve: Providing blended powder comprising a first powder material and a second powder material, the first and second powder materials capable of reacting with one another with the addition of energy to form a reaction product; forming the blended powder into a first layer; subjecting at least a portion of the first layer to energy sufficient to initiate a reaction between the first and second powder materials to form the reaction product, the reaction product in the first layer forming a portion of the article; forming additional quantities of the blended powder over the first layer to form a second layer; and subjecting at least a portion of the second layer to energy sufficient to initiate the reaction between the first and second powder materials to form the reaction product, the reaction product in the second layer also forming a portion of the article.

Also disclosed is a method of producing an article that involves the steps of: Providing a first material in powder form; providing a second material in powder form, the second material capable of reacting with the first material to form a reaction product; combining the first and second materials with a third material to form a blended paste, the blended paste comprising a substantially homogeneous mixture of the first, second, and third materials; extruding the blended paste; forming a green article from the extruded blended paste; and heating the green article to a temperature sufficient to initiate a reaction between at least the first and second materials to form the article, the article comprising the reaction product.

An additive manufacturing method of producing an article is also disclosed that includes: Providing a blended paste, the blended paste comprising a substantially homogeneous mixture of a first powder material, a second powder material, and a third material, the first and second powder materials capable of reacting with one another with the addition of energy to form a reaction product; extruding the blended paste; forming a green article from the extruded blended paste by building up individual layers of the blended paste; and heating the green article to a temperature sufficient to initiate a reaction between the first and second materials to form the article, the article comprising the reaction product.

Another additive manufacturing method of producing an article may include: Providing a blended paste, the blended paste comprising a substantially homogeneous mixture of a first powder material, a second powder material, and a third material, at least the first and second powder materials capable of reacting with one another with the addition of energy to form a reaction product; extruding the blended paste to form at least a portion of the article; and subjecting the blended paste to energy during said extruding, the energy being sufficient to initiate a reaction in said blended paste to form the reaction product.

Also disclosed is a method of adding material to a pre-existing article that includes: Providing a first material; providing a second material, the second material capable of reacting with the first material to form a reaction product; forming at least the first material into a layer on at least a portion of the pre-existing article; and subjecting at least a portion of the layer to energy in the presence of the second material, the energy being sufficient to initiate a reaction between the first and second materials to form the reaction product, the reaction product comprising an additional layer on at least a portion of the pre-existing article.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
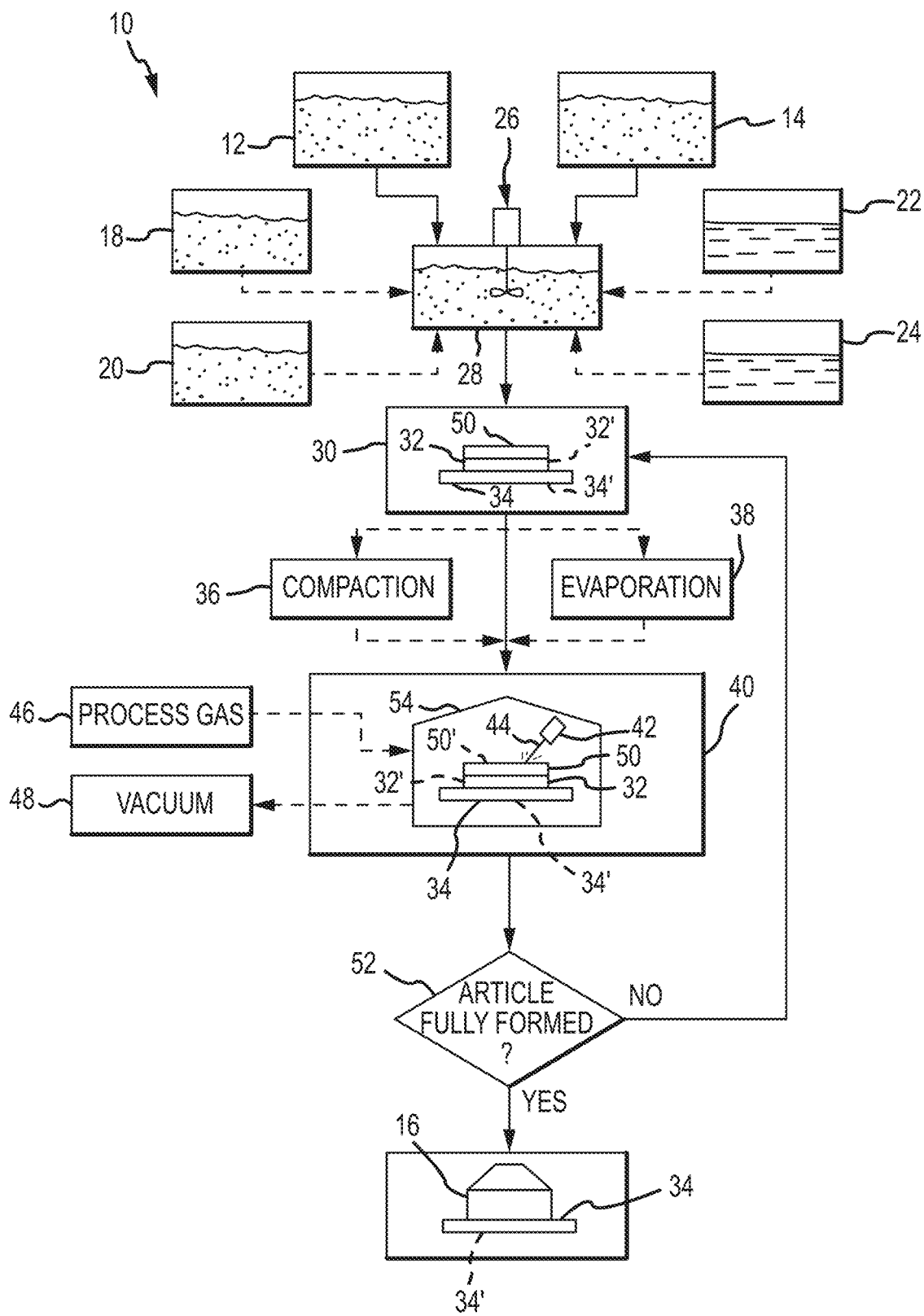
FIG. 1 is a process flow diagram of a reactive additive manufacturing process according to a first embodiment of the present invention.

One embodiment of a reactive additive manufacturing process 10 is illustrated in FIG. 1 and may involve providing at least a supply of a first material 12 and a second material 14. The first and second materials 12 and 14 are capable of reacting with one another upon the addition of energy to form a final article or product 16. In some embodiments, the first and second materials 12 and 14 may comprise powders, although the provision of the first and second materials 12 and 14 in powder form is not required. For example, in other embodiments, the second material may be provided in gaseous form e.g., in an atmosphere surrounding the first material 12, and made available to react with the first material 12 at an appropriate time during the process. Further, and as will be explained in much greater detail herein, additional materials, such as additional reactant materials 18, diluents 20, liquids 22, and binders 24 may be added, depending on a wide range of factors, including the type of final product 16 to be produced.

In some embodiments, the particular materials being used may be combined or mixed together, e.g., in a mixer or blender 26, to form a blended material 28. Blended material 28 may then be formed, e.g., in step 30, into a first layer 32 on a suitable base 34. Alternatively, if only one primary constituent is involved (e.g., in embodiments where the second material 14 is to be provided in gaseous form), the blending step may be omitted and the first layer 32 may be formed solely from the first material 12. In some embodiments, the first layer 32 may be formed by compacting the materials (e.g., either first material 12 or blended material 28) in an optional compaction process 36. Alternatively and/or additionally, the various materials (e.g., first material 12 or blended material 28) may be subjected to an optional evaporation process 38 to remove any liquid components that may be present in either the first material 12 or the blended material 28, as the case may be.

Figure 3:
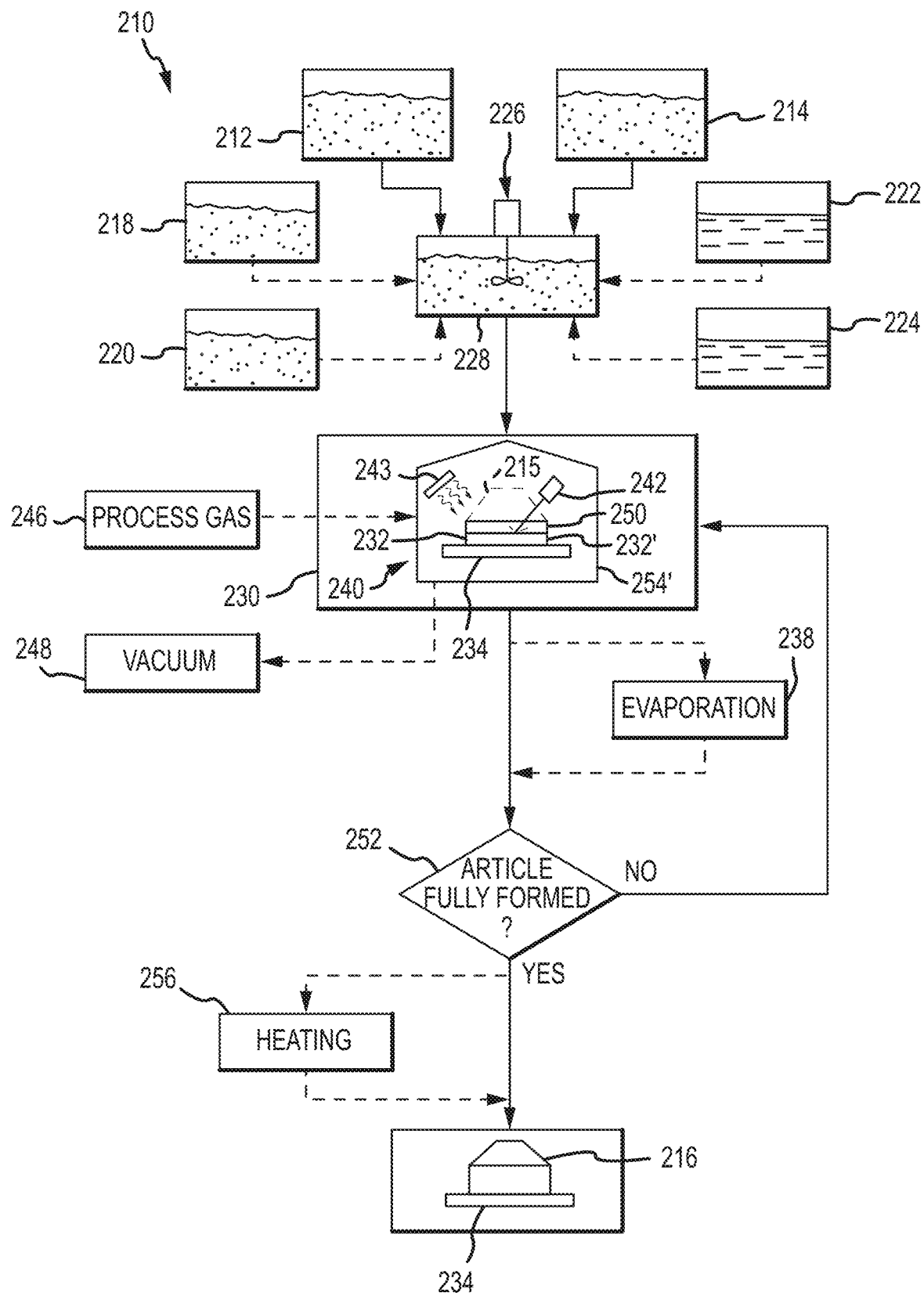
FIG. 3 is a process flow diagram of a third embodiment of a reactive additive manufacturing process.

Regardless of the particular materials and processes that may be used to form first layer 32, reactive additive manufacturing process 10 may then advance to step 40 in which at least a portion of the first layer 32 is subjected to energy sufficient to initiate a reaction between at least the first and second materials 12 and 14, thereby forming a reaction product. In some embodiments, the energy may be provided by a beam of directed energy 42, such as a laser beam 44. In other embodiments, the energy may be provided by a localized energy source, such as a heater or hot filament 243 (FIG. 3). In an embodiment wherein the energy is provided by a directed energy beam 42, the beam of directed energy 42 may be caused to move over the first layer 32 in the desired pattern, the result will be the formation of a reacted portion or layer 32' of the article 16 being manufactured. The reacted portion or layer 32' of article 16 will comprise primarily the reacted product, although it may also comprise other materials in lesser amounts, such as unreacted amounts of the first and second materials 12 and and/or partially reacted products of the first and second materials 12 and 14. Depending on the particular embodiment, step 40 may be conducted in the presence of a process gas 46, such as a reactive gas (e.g., which may comprise the second material 14 in some embodiments) or an inert gas. Alternatively, step 40 may be conducted in a vacuum 48 or a partial vacuum.

After the first layer 32 of the desired article 16 has been reacted to form reacted first layer 32', step 30 may be repeated in which a second layer 50 is formed over the just-reacted first layer 30'. Thereafter, step 40 may again be performed in which energy (e.g., from directed energy beam 42) is provided to the second layer 50 in an amount sufficient to initiate a reaction between at least the first and second materials 12 and 14 in order to form a reacted second layer 50' of the article 16. The reacted second portion or layer 50' of article 16 again will comprise primarily the reaction product of at least first and second materials 12 and 14, although it may comprise other materials as well. After it is determined that the article 16 is complete, e.g., at step 52, the process 10 may be terminated.

Depending on the particular embodiment, the as-produced article 16 may be surrounded by unreacted portions of the first and second materials 12 and 14 used to form the various reacted layers, e.g., 32' and 50'. Such material may be removed, e.g., mechanically, to reveal the final product or article 16.

A significant advantage of the present invention is that it may be used to produce articles comprising a wide range of shapes, material compositions, and mechanical or structural properties. In particular, existing additive manufacturing methods for producing high strength parts typically use homogeneous powder materials of the same composition as the desired product composition. This approach has resulted in a limited selection of materials that can be successfully utilized by existing additive manufacturing processes to produce high quality parts. The existing materials selection for the most common commercially available additive manufacturing processes is currently limited primarily to polymers and specific metal alloys. Since most existing additive manufacturing processes rely on heating layers of a part to near or above the melting temperature of the material, high temperature materials like many ceramics require high energy input and are difficult to manufacture with these processes. Due to the limitations of existing processes, ceramics, intermetallics, and metal ceramic composite materials are largely unavailable for use with additive manufacturing processes.

In the case of ceramic materials, the properties of ceramic articles produced by conventional ceramic processing techniques can often be improved by use of ceramic constituent powders with small particle sizes (e.g. less than about 10 μm and often less than about 1 μm diameter) to produce fine grained sintered ceramic articles. Such extremely fine particle sizes cannot be used in most existing powder bed additive manufacturing processes because the poor flowability of the fine powders results in difficulty obtaining an evenly spread layer.

In contrast to the various limitations, drawbacks, and disadvantages associated with known fabrication processes, the reactive additive manufacturing processes of the present invention provides for significant improvements and options in terms of material composition, energy requirements, and ease of manufacture.

For example, in embodiments where energy is released by an exothermic chemical reaction between the various constituents (e.g., first and second materials 12 and 14), less external energy input is required to achieve fusion of the powder form materials into a complete article 16. The lower external energy requirement allows for increased manufacturing speeds and/or reduced equipment costs. The invention allows additive manufacturing techniques to use materials that were not considered possible or practical with conventional additive manufacturing processes. Since the melting points of the reactant materials are often below the melting points of the product materials, the in-situ product synthesis utilized by the present invention can result in improved product densities compared to conventional additive manufacturing techniques that attempt to directly sinter or melt the high temperature product phase. In addition, since the product phases are formed in-situ, fine grained product materials can be formed even with use of relatively large-sized reactant materials. This allows for improved product properties while maintaining optimal powder flow and spreading characteristics for the blended mixture.

The use of constituent reactant materials also allows for increased flexibility to easily modify mixture compositions by changing the ratios of the constituent materials. For example, a blended mixture designed to produce a ceramic-metal matrix composite with 20 vol. % ceramic could easily be modified to instead produce a 25 vol. % ceramic-metal matrix composite. This flexibility is particularly useful for development work but can also be useful for readily customizing the material properties based on the specific combination most suitable for the product article.

Having briefly described one embodiment 10 of the reactive additive manufacturing process according to the present invention, as well as some of its more significant features and advantages, various embodiments, modifications, and alternative arrangements possible with the present invention will now be described in detail. However, before proceeding with the detailed description, it should be noted that the various exemplary embodiments are shown and described herein as they could be used with certain starting materials to make articles comprising reactive components of those materials. However, and as would become apparent to persons having ordinary skill in the art after having become familiar with the teachings provided herein, the present invention may be used with a wide variety of starting materials to form a wide variety of articles comprising a wide range of shapes, compositions, material, and structural properties. Accordingly, the present invention should not be regarded as limited to the particular materials, process steps, article shapes, compositions, and material properties shown and described herein.

Referring back now to FIG. 1, a reactive additive manufacturing process 10 according to one embodiment of the present invention may comprise providing a supply of a first material 12 and a second material 14. At least the first and second materials 12 and 14 are capable of reacting with one another upon the addition of energy to form a reaction product or products. As mentioned earlier, optional reactant materials 18 may be added that may react with materials 12 and 14 to form the reaction product or products.

In some embodiments, one or more diluent materials 20 may be added to absorb heat and reduce the reaction rate, reaction temperature, and the propagation rate and/or extent of the reaction. The additional diluent materials 20 may participate in the reaction as intermediary reactants, solvents, or catalysts that may reduce the energy input required to initiate the primary chemical reactions (e.g., between first and second materials 12 and 14 and any additional reactant materials 18). When one or more diluent materials 20 are added, it may be desirable to use pre-synthesized product materials of the same composition as one or more of the reaction products. It also may be desirable to use diluent materials 20 that confer beneficial properties to the article 16, such as metals or alloys, to serve as a matrix for reaction synthesized ceramic phases. Diluent materials 20 may also be chosen to provide other advantages such as aid in sintering of the product phases or to inhibit grain growth.

Reaction equations may be used to determine stoichiometric ratios for the relative quantities of the participating reactant species. The stoichiometric ratios can be readily converted to mass ratios using the molecular/atomic weights of the species, as would become apparent to persons having ordinary skill in the art after having become familiar with the teachings provided herein. The chemical energy released or absorbed by the reaction can be calculated with the use of tabulated chemical thermodynamic data tables such as the JANAF Thermochemical Tables, which are specifically incorporated herein by reference for all that they disclose. The calculated reaction energy can be used with temperature-dependent heat capacity and phase change energy data to calculate the adiabatic reaction temperature for the desired material system. The energy of the reaction, temperature dependent heat capacity data, and the energy density input from the directed energy beam 42 or localized energy (e.g., from heater or filament 243, FIG. 3) can be used to estimate the adiabatic peak temperatures that may be obtained during processing step 40.

For exothermic chemical reactions, the heat input by the directed energy source or localized energy source and the heat released by the chemical reaction will be conducted by the material to adjacent regions and may be sufficient to initiate the chemical reaction in these adjacent regions. In cases where the heat released by the chemical reaction alone is adequate to initiate the reaction in adjacent layers, the reaction may propagate throughout the contacting reactant material. In cases where the heat released by the chemical reaction alone is not adequate to initiate the reaction in adjacent layers, limited local reaction propagation may still occur due to the additional heat input from the directed energy source 42 or localized energy source 243. The distance of the local reaction propagation is affected by the energy input from the directed energy source and the energy released by the chemical reaction. As already mentioned, one or more diluent materials 20 may be utilized to control the extent and/or rate of propagation.

For powder bed embodiments (e.g., wherein the various layers 32, 50 are formed from powders), limited localized reaction propagation may be beneficial by allowing for increased processing speed and a favorable microstructure, however excessive propagation is generally not desirable because it will reduce the detail and tolerances that can be achieved by the additive manufacturing process. Therefore, for powder bed embodiments, it is generally preferable to design the reactant systems to limit reaction propagation.

Further, in embodiments wherein the materials are provided in powder form, it may be generally desirable to use powders having spherical shapes or morphologies due to their flowability. That is, the use of flowable powders improves the ability to distribute the powder into uniform layers. Powder flowability is also affected by the diameters of the particles, with particles that are too small having poor flow characteristics and particles that are too large limiting the ability to produce fine article detail and hindering chemical activity.

The particle sizes of each of the constituent powders may individually be controlled by the powder manufacturing techniques or classification steps (e.g. sieving) to provide powders of the desired sizes. The preferred size of each constituent powder may be based on the constituent material properties including density, morphology, hygroscopicity, oxygen affinity and oxide/hydroxide layer characteristics, and electrostatic interactions, again as would become apparent to persons having ordinary skill in the art after having become familiar with the teachings provided herein.

Referring back now to FIG. 1, it may also be desirable to add one or more liquids 22 and/or binders 24 to the mixture. Liquids 22 and/or binders 24 may be added to improve the flowability of the fine particles (e.g., materials 12, 14, 18, and 20) by binding them into agglomerates or to form a paste, slurry, suspension, colloidal suspension, or plastically deformable composite material. Any added liquids 22 and/or binders 24 may be selected to volatilize or decompose following the layer formation prior to or during the application of energy to initiate the chemical reaction. Such materials 22 and 24 also may participate in the chemical reaction to form product phases in the article 16.

By way of example, liquid 22 and/or binder 24 may comprise any of a wide range of waxes, polymers, or other low-melting temperature material that is a liquid, viscous liquid, or capable of undergoing viscous flow at room temperature or otherwise prior to or during the blending step.

The first and second materials 12, 14, and optionally any reactant, diluent, liquid, and/or binder material(s) 18, 20, 22, and 24 may be combined or mixed together in a suitable mixer 26 to form blended material 28. Mixer 26 may comprise any of a wide range of mixing devices, such as tumblers, mixers, ball mills, or blenders, that are known in the art or that may be developed in the future that are (or would be) suitable for the particular application (e.g., the formation of a slurry or colloidal suspension) and materials involved. The resulting blended material 28 may be spread to form first layer 32 in step 30. The blended material 28 may be so formed by any of a wide range of spreading and forming devices (not shown), such as, for example, coating blades, brushes, rollers, sprayers, or dispensers that are now known in the art or that may be developed in the future that are (or would be) suitable for forming the desired layers.

The first layer 32 may be spread or formed on a suitable base plate 34. Alternatively, the first layer 32 may be formed on a pre-existing article 34' which may comprise the same materials as the article 16. In such an embodiment, the article 16 so formed may be welded or otherwise bonded to the pre-existing article 34', although this is not required.

The material (e.g., the first material 12 alone, or the blended material 28) forming the various layers (e.g., 32, 50) optionally may be compressed or compacted, e.g., at step 36, to form a compacted layer. Such a compaction step may be accomplished by any of a wide range of compaction devices, such as press plates, dies, or rollers. Alternatively, the various layers (e.g., 32, 50), may be compacted or compressed by means of isostatic pressure. If a liquid 22 and/or binder 24 was added, then the liquid 22 and/or binder material 24 may be evaporated or decomposed in step 38. Step 38 may involve the application of heat and/or reduced pressure (e.g., a vacuum or partial vacuum) for a time sufficient to evaporate or decompose the liquid 22 and/or binder 24.

Thereafter, at least a portion of the layer 32 may then be subjected to energy (i.e., during step 40) sufficient to initiate the reaction between at least some of the materials comprising the layer 32. In some embodiments, energy sufficient for initiating the reaction may be provided by a directed energy beam 42 that may be caused to be directed over the layer 32 in the desired pattern. Directed energy beam 42 may comprise any of a wide range of directed energy beams, such as a laser (or similar type of electromagnetic radiation) beam 44, an electron (or other particle) beam, or an electric plasma arc. In other embodiments, the energy required to initiate the reaction may comprise a source of localized energy, such as a hot filament or heater 243 (FIG. 3) positioned adjacent the layer 32.

The temperature required to initiate the chemical reaction for a specific system (i.e., combination of materials in the layer 32) can be determined experimentally, obtained from literature, or estimated theoretically. The reaction initiation temperature can be converted to an energy requirement using heat capacity and phase change energy data for the reactant materials, as would become apparent to persons having ordinary skill in the art after having become familiar with the teachings provided herein.

In embodiments utilizing a directed energy beam 42, the directed energy beam 42 may be configured or adapted to provide sufficient energy to the portion of the layer 32 to initiate reactions between materials in the blended mixture 28 thereby forming the reaction products and fusing the materials together to form a reacted layer 32' in the article 16. If the first layer 32 was spread onto a base plate 34 or pre-fabricated article 34', the directed energy beam 42 and/or reaction energy may also fuse the reacted first layer 32' to the base plate 34 or article 34'.

As briefly mentioned earlier, and depending on the particular embodiment, step 40 may be conducted in the presence of a process gas 46, such as a reactive gas (e.g., which may comprise the second material 14 in some embodiments) or an inert gas. Alternatively, step 40 may be conducted in a vacuum or partial vacuum 48. If so, process 40 may be conducted in a suitable process chamber 54.

As mentioned, the reacted portion or layer 32' of article 16 may comprise primarily the equilibrium phases including the reactant products and optional diluent materials, although it may also comprise in lesser amounts non-equilibrium phases including unreacted reactant materials and intermediary compounds of the first and second materials 12, 14, and optionally additional reactant materials 18, diluent materials 20, and liquid/binder materials 22 and 24.

After the first layer 32' of the desired article 16 has been fully formed, step 30 may be repeated in which additional amounts of the reactive material(s) (e.g., first material 12 or blended material 28, depending on the particular embodiment) are spread or formed into a second layer 50 over the just-formed layer 32' of the article 16. Thereafter, step 40 may again be performed in which the directed energy source or beam 42 is directed over the second layer 50 in order to form a second reacted portion or layer 50' of the article 16. The second portion or reacted layer 50' of the article 16 again may comprise primarily the equilibrium product phases, although it may also comprise other non-equilibrium phases as well. The steps of adding additional layers (in step 30) and subjecting them to directed energy (in step 40) may be repeated until it is determined at step 52 that the article 16 is complete. When the article 16 is complete, the process 10 may be terminated.

In many embodiments, the manufactured article 16 will be surrounded by unreacted and non-fused portions of the material used to form the various layers. Such materials may be removed (e.g., mechanically), to reveal the final product or article 16.

Figure 2:
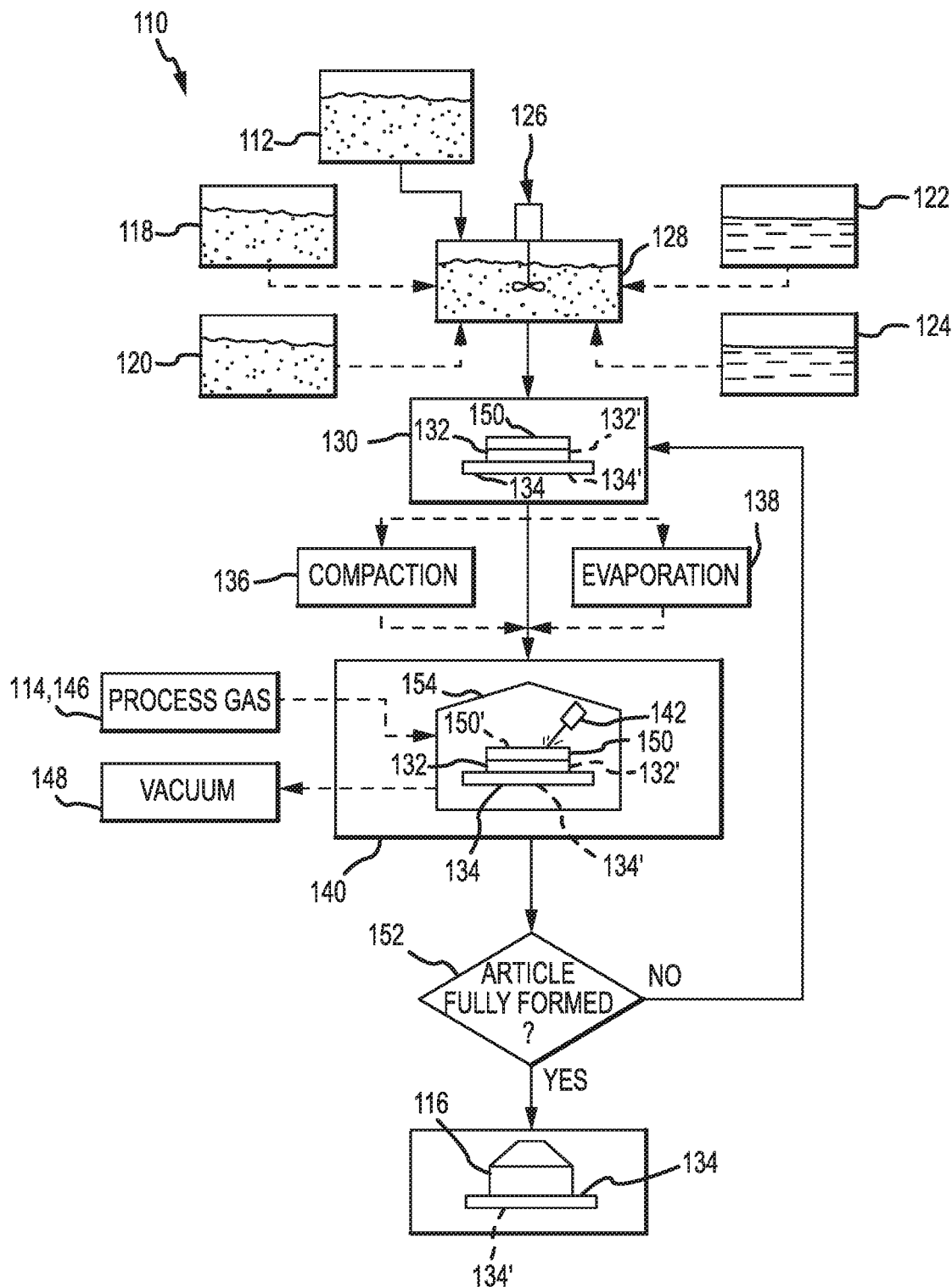
FIG. 2 is a process flow diagram of a reactive additive manufacturing process according to a second embodiment the present invention.

A second embodiment 110 of the reactive additive manufacturing process is illustrated in FIG. 2 and also may involve providing a supply of a first material 112 and second material 114. However, in the second embodiment 110, the second material 114 may be provided in gaseous form to a suitable process so that the gaseous material 114 forms an atmosphere around the various layers 132, 150. Thus, second material 114 may be referred to herein in the alternative as a process gas 146. The first material 112 is capable of reacting with the gaseous material 114 upon the addition of energy to form a reaction product or products.

Before proceeding with the description it should be noted that in other embodiments the second material 114 need not be provided in gaseous form. For example, in other embodiments, the second material 114 may be provided as a vapor, mist, spray or liquid. In still yet other embodiments, the second material 114 may be provided in wire, tube or strip form. In such embodiments, the wire, tube, or strip of second material 114 may be provided in the form of a consumable electrode to provide directed energy in the form of a plasma arc or electron beam.

As was the case for the first embodiment 10, one or more additional reactant material(s) 118 may optionally be added that may react with materials 112, 114 to form a reaction product or products. One or more diluent material(s) 120 also may be added to absorb heat and reduce the reaction rate, reaction temperature, reaction extent, or amount of propagation of the reaction. As already described, the additional diluent materials 120 may participate in the reaction as intermediary reactants, solvents, or catalysts that may reduce the energy input required to initiate the primary chemical reactions. When diluent materials 120 are added, it may be desirable to use pre-synthesized product materials of the same composition as one or more of the reaction products. It also may be desirable to use diluent materials 120 that confer beneficial properties to the final article 116 such as metals or alloys to serve as a matrix for reaction synthesized ceramic phases. Diluent materials 120 may also be chosen to provide other advantages such as aid in sintering of the product phases or to inhibit grain growth.

Here again, and as was the case for the first embodiment 10, reaction equations may be used in the second embodiment 110 to determine stoichiometric ratios for the relative quantities of the participating reactant species. The stoichiometric ratios can be readily converted to mass ratios using the molecular/atomic weights of the particular species involved. The chemical energy released or absorbed by the reaction can be calculated with the use of tabulated chemical thermodynamic data tables such as the JANAF Thermochemical Tables. This calculated reaction energy can be used with temperature dependent heat capacity and phase change energy data for all constituents to calculate the adiabatic reaction temperature for the material system. The energy of the reaction, temperature dependent heat capacity data, and the energy density input from the directed energy source can be used to estimate the adiabatic peak temperatures that may be obtained during processing.

For exothermic chemical reactions, the heat input by the directed energy source and the heat released by the chemical reaction will be conducted by the material in layer 132 to adjacent regions and may be sufficient to initiate the chemical reaction in these adjacent regions. In cases where the heat released by the chemical reaction alone is adequate to initiate the reaction in adjacent layers (e.g., second layer 150), the reaction may propagate throughout the contacting reactant material. In cases where the heat released by the chemical reaction alone is not adequate to initiate the reaction in adjacent layers, limited local propagation may still occur due to the additional heat input from the directed energy source 142. The distance of the local propagation is affected by the energy input from the directed energy source 142 and the energy released by the chemical reaction. Diluent materials 118 may be utilized to control the extent of propagation.

In most variations of the second embodiment 110, the first material 112 and optional materials 116 and 118 will comprise powders, although the provision of powder form is not required. Here again, spherical powder morphologies are generally preferred to improve the ability to distribute the powder into a uniform layer (i.e. the powder flowability.) The powder flowability is also affected by the diameters of the particles with particles that are too small having poor flow characteristics and particles that are too large limiting the ability to produce fine article detail and hindering chemical activity. The particle sizes of each of the constituent powders may individually be controlled by the powder manufacturing techniques or separation techniques (e.g. sieving) to provide powders of the desired sizes. The preferred size of each constituent powder may be based on the constituent material properties including density, morphology, hygroscopicity, oxygen affinity and oxide/hydroxide layer characteristics, and electrostatic interactions.

It may also be desirable in the second embodiment 110 to add one or more liquids 122 and/or binders 124 to the first material 112. Here again, liquids 122 and/or binders 124 may be added to improve the flowability of the first material 112 and/or any added materials (e.g., materials 118 and 120) by binding them into agglomerates or to form a paste, slurry, suspension, colloidal suspension, or plastically deformable composite material. Any added liquids 122 and/or binders 124 may be selected to volatilize or decompose following the layer formation prior to or during the application of energy to initiate the chemical reaction. Such materials 122 and 124 also may participate in the chemical reaction to form product phases in the article 116. Liquid 122 and/or binder 124 may comprise any of a wide range of waxes, polymers, or other low-melting temperature material that is a liquid, viscous liquid, or capable of undergoing viscous flow at room temperature or otherwise prior to or during the blending step.

The first material 112 and optionally any additional reactant, diluent, liquid, and/or binder material(s) 118, 120, 122, and/or 124 may be combined or mixed together, e.g., in a suitable mixer 126 to form a blended material 128. The resulting blended material 128 may be spread on a base 134 or pre-existing article 134' in step 130 to form a first layer 132. As was the case for the first embodiment 10, any of a range of spreading or forming devices, such as coating blades, brushes, rollers, sprayers, or dispensers, may be used for this purpose.

The material (e.g., the first material 112 alone or the blended material 128) forming the various layers optionally may be compressed or compacted at step 136 to form a compacted layer. Again, any of a wide range of compaction devices, such as press plates, dies, or rollers may be used for this purpose. The layers may also be compressed or compacted by means of isostatic pressure. If a liquid 122 or binder 124 was added, then such material 122 and 124 may be evaporated or decomposed in optional evaporation step 138. Step 138 may involve the application of heat and/or reduced pressure for a time sufficient to evaporate or decompose substantially all of the liquid and/or binder material 122, 124, as the case may be. Here again, the compaction and evaporation steps 136 and 138 may be conducted separately or in combination. Alternatively, neither the compaction nor evaporation steps 136 and 138 need be conducted.

In the second embodiment 110, the second material 114 (i.e., which may comprise process gas 146) may be introduced into the process chamber 154. The process gas 146 may comprise a single reactive gas type (e.g., second material 114), multiple reactive gas types, or a reactive gas together with one or more inert gases, e.g. argon.

Thereafter, the first layer 132 may be subjected to energy during step 140 to form a reacted portion or layer 132' of the article 116 to be manufactured. Here again, the energy provided may comprise directed energy (e.g., from a directed energy beam 142). Alternatively, the energy may comprise localized energy, such as from a hot filament or heater 243 (FIG. 3). The process gas 146 (i.e., which may comprise second reactant material 114) may be provided at controlled pressures, flow rates, and/or ratios to control the reaction products, rates, peak temperatures, reaction propagation, or extent of completion during the reaction process. For variations involving process chamber 154, the atmosphere of process gas 146 may be maintained during layer spreading through subjection to energy at step 140, including optional compaction 136 and/or evaporation 138 steps. In embodiments wherein the process chamber 154 may also serve as a pressure vessel, the pressure of the process gas 146 may be selected to be maintained at any desired pressure, i.e., above or below ambient pressure. Alternatively, process 140 may be conducted in a vacuum or partial vacuum 148.

In embodiments wherein the energy required to initiate the reaction is provided by directed energy, the directed energy beam 142 may be controlled or configured to provide sufficient energy to the portion of the layer 132 to initiate reactions between the materials, thereby forming the reaction products and fusing the materials together to form a reacted layer 132'. If the first layer 132 was spread onto a compatible base plate 134 or pre-fabricated article 134', then the directed energy beam 142 and/or reaction energy may also fuse the first layer 132' to the plate 134 or pre-fabricated article 134'. The reaction products may include products formed by reaction of components of the reactive material(s) in blended mixture 128, products formed by reaction of components in the blended mixture 128 with the various species (i.e., second reactant 114) comprising process gas 146, and products formed by reaction of components of the process gas 146 reacting with other components in the process gas 146. The reacted layer 132' may also comprise equilibrium phases including the reactant products and optional diluent materials, although it may also comprise non-equilibrium phases including unreacted reactant materials and intermediary compounds of components of the blended materials 128 and process gas 146.

After the first layer 132' of the desired article 116 has been fully formed, step 130 may be repeated in which additional amounts of the blended material 128 are spread, formed, or (optionally) compacted over the just-formed layer 132' of the article 116 to form a second layer 150. Thereafter, step 140 again may be performed in which the directed energy beam 142 is directed over the second layer 150 in order to form a second reacted portion or layer 150' of the article 116 to be manufactured. The second portion or layer 150' of the article 116 again may comprise the equilibrium product phases of the various constituents, although it may also comprise other non-equilibrium phases as well. The steps 130 and 140 of adding an additional layer and subjecting it to directed energy may be repeated until it is determined at step 152 that the article 116 is complete. When the article 116 is complete, the process 110 may be terminated. In most versions of this second embodiment 110, the manufactured article 116 will be surrounded by unreacted and non-fused portions of the blended material 128 used to form the various layers (e.g., 132', 150'). Such materials may be removed (e.g., mechanically), to reveal the final product or article 116.

Still other variations and modifications of the present invention are possible. For example, and with reference now primarily to FIG. 3, a third embodiment 210 of a reactive additive manufacturing process according to the present invention may involve the formation of a blended paste material 228 which thereafter may be extruded at step 230 to form a 'green' article 215. Depending on the particular final article 216 that is to be produced, green article 215 may comprise substantially the entirety of the final article 216. Alternatively, green article 215 may comprise a smaller portion, or even an individual layer 232 of the final article 216.

Once the green article 215 or layer 232 has been fully formed, it may then be heated e.g., by a heater 243, to initiate one or more chemical reactions and form the final article 216. Alternatively, the green article 215 or layer 232 may be subjected to a directed energy beam 242 prior to adding subsequent layers 250. The heat or directed energy may partially or fully fuse the layers 230, 250 and may or may not be sufficient to initiate one or more chemical reactions in the layers. In this embodiment, if the chemical reactions have already formed the desired product phases when subjecting the layers to heat or directed energy, the fully formed article 216 may comprise the final article 216 without the requirement for further subjection to heat, e.g., during step 256. The most substantial difference in this third embodiment 210 compared to the first embodiment 10 is that the blended material 228 is applied only to the layer locations where the article is to be formed as opposed to being spread over an entire bed as was the case in the first embodiment 10.

More specifically, method 210 may involve providing first and second materials 212 and 214 and optionally additional reactant and diluent materials 218 and 220. As was the case for the first and second embodiments 10 and 110, the first and second materials 212 and 214 and optional reactant materials 218 are capable of reacting with one another upon the addition of energy to form a desired reaction product or products for the formation of the article 216.

As was the case for the other embodiments 10 and 110, one or more diluents 220 may be added to absorb heat and/or reduce the reaction rate, reaction temperature, and amount of propagation of the reaction. The additional diluent materials 220 may participate in the reaction as intermediary reactants, solvents, or catalysts that may reduce the energy input required to initiate the primary chemical reactions. When diluent materials 220 are added, it may be desirable to use pre-synthesized product materials of the same composition as one or more of the reaction products. It also may be desirable to use diluent materials 220 that confer beneficial properties to the article such as metals or alloys to serve as a matrix for reaction synthesized ceramic phases. Diluent materials 220 may also be chosen to provide other advantages such as aid in sintering of the product phases or to inhibit grain growth.

In many embodiments, the first and second materials 212 and 214, and optional additional reactant and diluent materials 218 and 220 may be provided in powder form, although the provision of these materials in powder form is not required. Once the first and second materials 212 and 214 and optional additional reactant and/or diluent materials 218 and/or 220 have been provided, they may be combined or mixed together, e.g., in a suitable mixer 226 to form a blended material 228. In most variations on this embodiment 210, the blended material 228 should comprise a paste or paste-like material (e.g., a slurry or colloid) suitable for later extrusion. Accordingly, in the particular embodiment shown and described herein, a liquid 222 and/or a binder 224 may be added during the blending process to form the blended paste or paste-like material 228.

As was the case for the other embodiments 10 and 110, reaction equations may be used in the embodiment 210 to determine stoichiometric ratios for the relative quantities of the participating reactant species. The stoichiometric ratios can be readily converted to mass ratios using the molecular/atomic weights of the species. The chemical energy released or absorbed by the reaction can be calculated with the use of tabulated chemical thermodynamic data tables such as the JANAF Thermochemical Tables. The calculated reaction energy can be used with temperature-dependent heat capacity and phase change energy data for all constituents to calculate the adiabatic reaction temperature for the material system. The energy of the reaction, temperature-dependent heat capacity data, and the energy density input from the directed energy source can be used to estimate the adiabatic peak temperatures that may be obtained during processing.

For exothermic chemical reactions, the heat input at step 240 (or step 256) together with the heat released by the chemical reaction will be conducted by the reacting material to adjacent regions may be sufficient to initiate the chemical reaction in these adjacent regions. In cases where the heat released by the chemical reaction is adequate to initiate the reaction in adjacent layers, the reaction may propagate throughout the reactant material. In cases where the heat released by the chemical reaction alone is not adequate to initiate the reaction in adjacent layers, limited local propagation may still occur due to the additional heat input from the directed energy source 242 or heater 243. The distance of the local propagation is affected by the energy input from the directed energy source 242 or heater 243 and the energy released by the chemical reaction. Again, one or more diluent materials 220 may be utilized to control the extent of reaction propagation. For extrusion based embodiments, such as third embodiment 210, full propagation of the chemical reaction may be desirable.

After the various constituent materials have been combined and blended together, the resulting blended paste material 228 may be extruded in step 230 to form the green article 215 or a portion or layer 232 of the article to be manufactured. Any liquid and/or binder materials 222 and/or 224 that were added may optionally be evaporated or decomposed from the extruded material in step 238 by application of heat and/or reduced pressure for a sufficient time. In step 240, the extruded layer 232 may optionally be subjected to directed energy beam 242 or heat from a heater 243 in order to partially or fully fuse the material to form a fused or reacted layer 232'. In this embodiment it should be noted that the energy provided by directed energy beam 242 or heater 243 during step 240 may or may not be sufficient to initiate one or more chemical reactions in the green article 215 or layer 232. In this variation, if the chemical reactions have already formed the desired product phases when subjecting the various layers (e.g., 232, 250) to heat or directed energy, the fully formed article may be the final article 216 without the requirement for further subjection to heat at step 256.

Depending on the particular materials involved and/or the final article 216 to be produced, step 240 may be conducted in the presence of a process gas 246. Process gas 246 may comprise a reactive gas or an inert gas. If so, process 240 may be conducted in a suitable process chamber 254. Alternatively, step 240 may be conducted in a vacuum or a partial vacuum 248.

Additional extruded layers (e.g., second layer 250) may be added until the article is fully formed, e.g., as determined at step 252. In a variation of the third embodiment 210, the extrusion process may progress in a continuous manner without discontinuation of the extrusion process between layers. In such a continuous extrusion process, the optional application of heat or directed energy may also progress in a continuous manner until the article 216 is fully formed. If the article layers have not been subjected to heat or directed energy sufficient to initiate the chemical reactions to form the desired product phases (i.e., during step 240), the formed or manufactured article will continue to comprise a 'green' article 215, and will comprise the unreacted materials (e.g., first and second materials 212 and 214 and optionally additional reactant materials 218, diluent materials 220, and any liquid and/or binder materials 222 and/or 224 comprising the blended paste 228.

Thereafter, the green article 215 may be heated at step 256 in order to initiate the reaction between the first and second materials 212 and 214 and optional additional reactant materials 218, diluent materials 220, and any liquid and/or binder materials 222, 224. The temperature and time required to initiate and complete the chemical reaction for a specific system can be determined experimentally, obtained from literature, or estimated theoretically. The reaction initiation temperature can be converted to an energy requirement using heat capacity and phase change energy data for the reactant materials.

The result will be a final article 216 comprising primarily the reaction product of first and second materials 212 and 214 and optionally additional reactant materials 218 and liquid and/or binder materials 222 and/or 224, as well as any optional diluent materials 220. Depending on the particular materials involved, any liquid and/or binder materials 222 and/or 224 used to form the blended paste 228 may be removed either during the optional evaporation step 238 or during the heating steps 240 or 256. The liquid and/or binder materials 222 and/or 224 may alternatively decompose instead of fully evaporate or participate in the chemical reactions to contribute to the product phases.

EXAMPLES

Reaction Equation Examples

A wide range of product materials can be produced by the methods described in this invention. The invention can be used to produce materials including metals, intermetallics, ceramics, composites, and polymers. Examples of suitable reactions are given below to illustrate the versatility of the process and the inventions should not be limited by these examples. The stoichiometric coefficients (unity where not indicated) represent the number of moles of each species. The variables x and y are used to represent diluent coefficients that can be varied to adjust the reaction temperature and/or product composition. The calculated adiabatic combustion temperature, $T_{ad}$, with a starting temperature of 298 K is given for the solid phase reactions for the indicated stoichiometric coefficients.

TABLE I

Example Reactions

| Reactants | Products | Energy (kJ) | $T_{ad(298k)}$ (K) |
|---|---|---|---|
| Ti + C | TiC | −185 | 3433 |
| Ti + 2B | $TiB_2$ | −280 | 3450 |
| $3Ti + B_4C$ | $2TiB_2 + TiC$ | −682 | 3230 |
| Si + C | SiC | −72 | 1852 |
| W + C | WC | −40 | 1164 |
| B + 4C | $B_4C$ | −62 | 957 |
| Ni + Ti | NiTi | −68 | 1438 |
| Mo + 2Si | $MoSi_2$ | −119 | 1799 |
| $4Al + 3TiO_2 + 3C$ | $2Al_2O_3 + 3TiC$ | −1071 | 2355 |
| Ti + Si + 2C | TiC + SiC | −256 | 2763 |
| $B_2O_3 + Ti + 2Al$ | $TiB_2 + Al_2O_3$ | −682 | 2846 |
| $B_2O_3 + 2B + C + 2Al$ | $B_4C + Al_2O_3$ | −464 | 2200 |
| Mo + 2Se | $MoSe_2$ | −154 | 2213 |
| $Fe_2O_3 + 2Al$ | $Al_2O_3 + 2Fe$ | −853 | 2862 |
| $3CaO + P_2O_5$ | $Ca_3(PO_4)_2$ | −170 | 2083 |

TABLE II

Examples with Diluent/Intermediary Reactant/Catalyst/Solvent Species:

| Reactants | Products | For x,y | Energy (kJ) | $T_{ad\,(298K)}$ (K) |
|---|---|---|---|---|
| Ti + C + xTiC | (1 + x) TiC | 1 | −185 | 2075 |
| | | 5 | −185 | 964 |
| Ti + C + xTiC + yAl | (1 + x)TiC + yAl | 1,1 | −185 | 1634 |
| | | 2,5 | −185 | 933 |
| Ti + C + xNi | TiC + xNi | 1 | −185 | 2193 |
| | | 5 | −185 | 1193 |
| Ti + 2B + xNi | $TiB_2$ + xNi | 1 | −280 | 2498 |
| | | 5 | −280 | 1488 |
| $3Ti + B_4C + xAl$ | $2TiB_2 + TiC + xAl$ | 1 | −682 | 2096 |
| | | 10 | −682 | 1462 |
| W + C + xCo | WC + Co | 1 | −40 | 840 |
| | | 0.33 | −40 | 1018 |
| $Fe_2O_3 + 2Al + xFe$ | $Al_2O_3 + (2 + x) + Fe$ | 1 | −853 | 2927 |
| | | 15 | −853 | 1536 |
| $(3 + x) SiO_2 + 4Al + ySi + (3 + y)C$ | $xSiO_2 + (3 + y)SiC + 2Al_2O_3$ | 1,1 | −906 | 2068 |
| | | 2,5 | −1194 | 1878 |

TABLE III

Examples involving gas phase reactants:

| Reactants | Products | Energy (kJ) |
|---|---|---|
| Ti + ½ $N_2$ | TiN | −338 |
| $3Si + 2N_2$ | $Si_3N_4$ | −829 |
| $2Al + 3/2\, O_2$ | $Al_2O_3$ | −1676 |
| $Zr + H_2$ | $ZrH_2$ | −169 |
| $Zr + O_2$ | $ZrO_2$ | −1100 |
| $Zr + O_2 + xZrO_2$ | $(1 + x)\, ZrO_2$ | −1100 |
| $Zr + O_2 + xCaO$ | $ZrO_2 + CaO$ | −1100 |

Article Examples

Example 1—$TiB_2$—TiC-85Al

An exothermically reactive mixture containing by weight 76.8% aluminum, 16.8% titanium, and 6.5% boron carbide powders was designed to produce a product with an aluminum matrix and ceramic reinforcing phases comprising by volume 85% aluminum, 10.75% titanium diboride, and 4.25% titanium carbide. The mixture has a calculated adiabatic reaction temperature of 933 Kelvin. A mixture with a total weight of 4000 g. was prepared by weighing the constituent powders according to the percentages above. The powders were mixed using a motorized tumbler. The mixed powders were then placed in the dispenser tray of an EOS M290 direct metal laser sintering (DMLS) machine, available from EOS of North America, Inc. of Novi, Mich. (US).

Three dimensional models of articles for manufacture were designed using a computer aided design (CAD) software program and digitally sliced into layers corresponding to the thickness of one layer of powder to be spread. The digital information was sent to the EOS M290 DMLS machine.

The processing chamber of the M290 DMLS machine was flooded with argon gas and a layer of the powder mixture having a thickness of about 30 μm was spread across an aluminum base plate by a re-coater blade. The M290 ytterbium fiber laser traced the first slice of the articles onto the powder layer, thereby heating the traced regions to a temperature adequate to initiate the exothermic chemical reaction. The combined energy from the laser and chemical reaction in the traced regions was adequate to initiate the exothermic chemical reaction. The combined energy from the laser and chemical reaction in the traced regions was adequate to produce fusion by sintering and melting of the product materials to themselves and to the aluminum alloy build plate. A second layer of the powder mixture was then spread over the first layer by the re-coater blade and the second slice of the articles was traced by the laser to initiate the chemical reaction in this layer. The energy of the laser and chemical reaction caused the traced regions of the second layer to fuse to itself and to the first layer. The process was then repeated layer-by-layer until the complete article had been manufactured. The finished articles were then removed from the build plate by cutting them off with a band saw.

Figure 4:
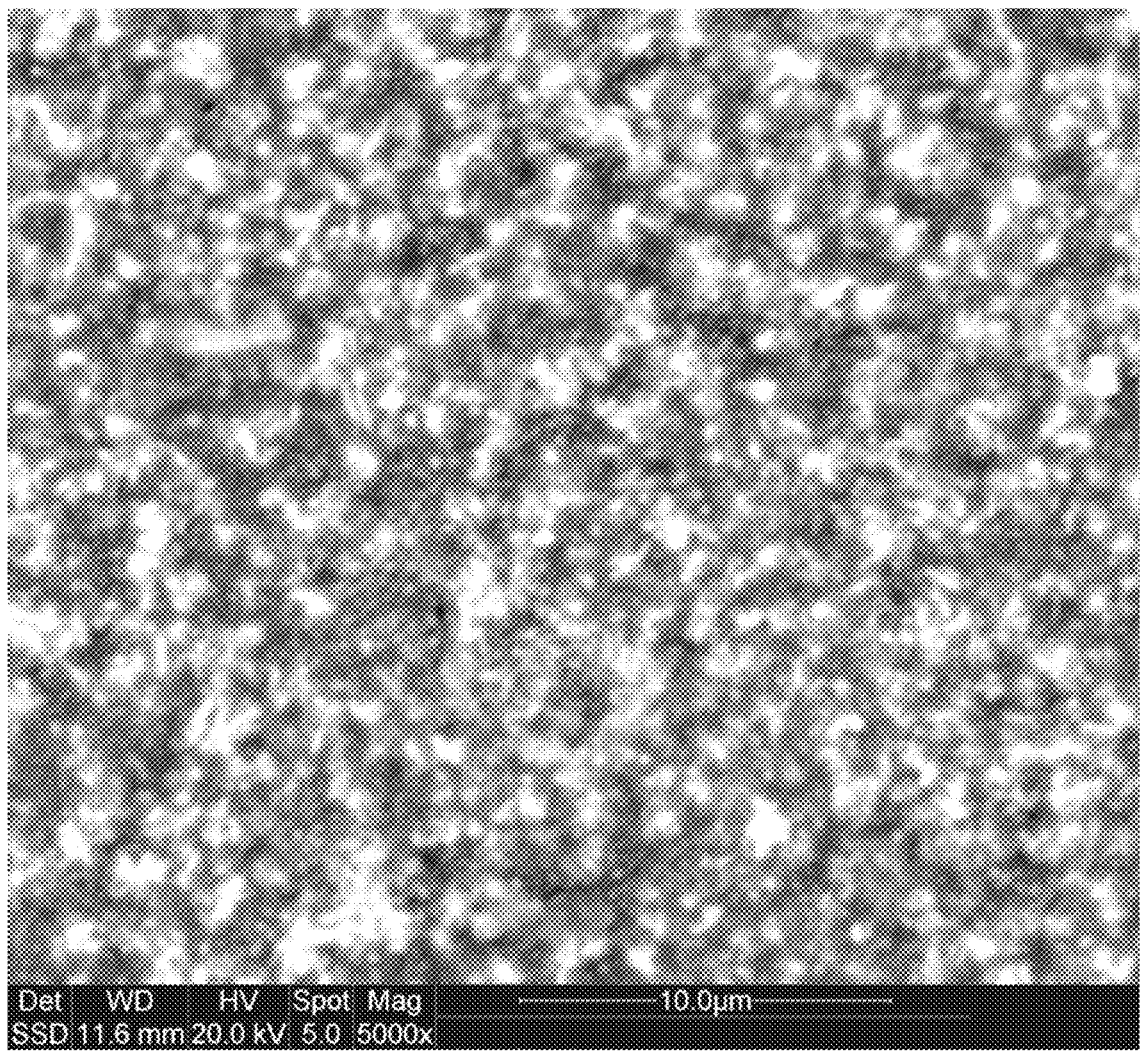
FIG. 4 is a scanning electron micrograph at 5000× magnification of a portion of an Example 1 article.

A total of 20 articles were manufactured on the build plate in one production run using either single or double laser exposures per layer with unique combinations of laser power and travel velocity settings for each part. The product phases of the articles were examined by x-ray diffraction and scanning electron microscopy (SEM) and found to be primarily titanium diboride and titanium carbide in an aluminum matrix. An SEM micrograph of one of the Example 1 articles is reproduced herein as FIG. 4.

The densities of the parts were measured relative to the theoretical density of 3.00 g/cm$^3$ using Archimedes method and found to have theoretical densities in a range of from about 92.04% to about 99.63%, depending on the combination of laser exposures and laser power and travel velocity used for the part. Hardness values were measured using the Rockwell B scale (HRB) with measurements found to average 62.9 HRB (approximately 1100 MPa) for a part with a high relative density. The measured hardness of the aluminum matrix composites compares favorably to literature values for commercially pure aluminum with a reported Brinell hardness of 30 BHN500 (approximately 294 MPa) which is below zero on the HRB scale.

Example 2—(Ti—V)B$_2$, C-85Al—Mg Matrix

An exothermically reactive mixture containing by weight 75.19% aluminum/4.5% magnesium alloy powder, 18.23% titanium/6% aluminum/4% vanadium powder, and 6.58% boron carbide powder was designed to produce a product with an aluminum/4.5% magnesium matrix comprising by volume 85% and ceramic reinforcing phases comprising by volume 15% titanium and vanadium diborides and carbides. The mixture has a calculated adiabatic reaction temperature of 933 Kelvin. A mixture with a total weight of 4000 g. was prepared by weighing the constituent powders according to the percentages above. The powders were mixed using a motorized tumbler. The mixed powders were then placed in the dispenser tray of the EOS M290 direct metal laser sintering (DMLS) machine.

Three dimensional models of articles for manufacture were designed using a computer aided design (CAD) software program and digitally sliced into layers corresponding to the thickness of one layer of powder to be spread. The digital information was sent to the EOS M290 DMLS machine.

The processing chamber of the DMLS machine was flooded with argon gas and a layer of the powder mixture having a thickness of about 30 µm was spread across an aluminum build plate by a re-coater blade. The M290 ytterbium fiber laser traced the first slice of the articles onto the powder layer, thereby heating the traced regions to a temperature adequate to initiate the exothermic chemical reaction. The combined energy from the laser and chemical reaction in the traced regions was adequate to produce fusion by sintering and melting of the product materials to themselves and to the aluminum alloy build plate. A second layer of the powder mixture was then spread over the first layer by the re-coater blade and the second slice of the articles was traced by the laser to initiate the chemical reaction in this layer. The energy of the laser and chemical reaction caused the traced regions of the second layer to fuse to itself and to the first layer. The process was then repeated layer-by-layer until the complete articles had been manufactured. The finished articles were then removed from the build plate by wire electrical discharge machining (EDM).

A total of 20 articles were manufactured on the build plate in one production run using either single or double laser exposures per layer with unique combinations of laser power and travel velocity settings for each part. The product phases of the articles were examined by x-ray diffraction and SEM and found to be primarily titanium diboride and titanium carbide with lesser amounts of vanadium diboride and carbide in an aluminum-magnesium alloy matrix. The densities of the parts were measured relative to the theoretical density of 2.95 g/cm$^3$ using Archimedes method and found to range from about 97.7% to about 100% theoretical, depending on the combination of laser exposures and laser power and travel velocity used for the part. Hardness values were measured using the Rockwell B scale (HRB) and found to average 90.4 HRB (approximately 1900 MPa) for a part with 100% relative density. The measured hardness of the aluminum matrix composites compares favorably to literature values for commercially pure aluminum with a hardness of 30 BHN500 (approximately 294 MPa) which is below zero on the HRB scale. The hardness value also compares favorably with that of the pure aluminum matrix composite described in Example 1.

Example 3—NiTi

An exothermically reactive mixture containing by weight 55.5% nickel and 44.5% titanium was designed to produce a product comprised of intermetallic nickel-titanium shape memory alloy. The mixture has a calculated adiabatic reaction temperature of 1438 Kelvin. A mixture with a total weight of 2500 g. was prepared by weighing the constituent powders according to the percentages above. The powders were mixed using a motorized tumbler. The mixed powders were then placed in the dispenser tray of the EOS M290 direct metal laser sintering (DMLS) machine.

Three dimensional models of articles for manufacture were designed using a computer aided design (CAD) software program and digitally sliced into layers corresponding to the thickness of one layer of powder that will be spread. The digital information was sent to the EOS M290 DMLS machine.

The processing chamber of the DMLS machine was flooded with argon gas and a layer of the powder mixture having a thickness of about 40 µm was spread across a 316L stainless steel build plate by a re-coater blade. The M290 ytterbium fiber laser traced the first slice of the articles onto the powder layer, thereby heating the traced regions to a temperature adequate to initiate the exothermic chemical reaction. The combined energy from the laser and chemical reaction in the traced regions was adequate to produce fusion by sintering and melting of the product materials to themselves and to the 316L alloy build plate. A second layer of the powder mixture was then spread over the first layer by the re-coater blade and the second slice of the articles was traced by the laser to initiate the chemical reaction in this layer. The energy of the laser and chemical reaction caused the traced regions of the second layer to fuse to itself and to the first layer. The process was then repeated layer-by-layer until the complete articles had been manufactured. The finished articles were then removed from the build plate by cutting them off with a band saw.

A total of 12 articles were manufactured on the build plate in one production run using either single or double laser exposures per layer with unique combinations of laser power and travel velocity settings for each part. The product phases of the articles were examined by x-ray diffraction and SEM and found to be primarily one-to-one nickel-titanium intermetallic. The densities of the parts were measured relative to the theoretical density of 6.5 g/cm$^3$ using Archimedes method and found to range from about 86.7% to about 97.2% depending on the combination of laser exposures and laser power and travel velocity used for the part. The parts were suitable for shape setting with subsequent heat treatment and mechanical deformation.

Example 4—Extrusion

An exothermically reactive mixture containing by weight 55.12% titanium, 13.83% carbon, and 31.06% aluminum was designed to produce a product with an aluminum matrix comprising by volume 45% and titanium carbide particles comprising by volume 55%. The mixture has a calculated adiabatic reaction temperature of 2368 Kelvin. A mixture with a total weight of 200 g. was prepared by weighing the constituent powders according to the percentages above. The powders were hand shaken in a Nalgene style bottle and poured into a glass beaker where 80 g. of propylene glycol was subsequently added. The powders were mixed with the liquid propylene glycol by hand stirring using a stainless steel stirring utensil. The mixed powders and propylene glycol slurry were then placed in a flexible polymer bag with a nozzle attachment suitable for extrusion of the material by application of pressure on the bag containing the material.

Three steel sheet metal build plates were placed onto the surface of an electric hot plate to maintain a temperature of about 210° C. Individual articles were extruded to each of the three sheet metal build plates with the propylene glycol vaporizing during the extrusion process due to the elevated temperature of the build plate. The first article extrusion was completed by extruding the material in a continuous fashion to produce a green part comprised of 15 continuously fed interconnected layers of extruded material. The second article was produced by continuously extruding one layer of the article and then disconnecting the extruded material before starting the next layer. The third green article was completed by extruding a series of segments on each layer with discontinuities between the end of one segment and the start of the next as well as discontinuities between each layer. Although the extrusion process was performed manually in this example, the process is suitable for computer based automation.

The green articles were then reacted by local contact with an oxygen-acetylene flame to locally initiate the exothermic chemical reaction which then self-propagated throughout the article. The high temperature chemical reaction rapidly transformed the reactant materials into the product phases thereby fusing and strengthening the articles as well as vaporizing any volatile impurities such as residual propylene glycol. The reacted articles maintained the form produced during extrusion and exhibited have high abrasion resistance due to the hardness of the titanium carbide product phase.

Example 5—SiC

An exothermically reactive mixture containing by weight 70.0% silicon and 30.0% carbon was designed to produce a product comprised of silicon carbide. The mixture has a calculated adiabatic reaction temperature of 1852 Kelvin. A mixture with a total weight of 10 g. was prepared by weighing the constituent powders according to the percentages above. The powders were mixed by shaking followed by hand milling with a mortar and pestle.

An Epilog Zing laser engraver with a 40 Watt carbon dioxide laser was modified to include a steel die having a cylindrical bore of about 25.4 mm (about 1 inch) with the die height positioned by the adjustable height positioning table while the cylindrical press rod passed through a hole in the positioning table to sit flat on the machine base at a fixed height. The Epilog Zing laser engraver was placed inside a controlled atmosphere glove box and the glove box was flooded with argon gas. The positioning table height was adjusted so that there was a gap of about 2 mm between the press rod and the top of the die. A layer of the mixed powders was placed on top of the press rod in the die and the layer of powders was scraped flat by hand using a steel scraping blade so the top of the layer was level with the top of the die.

A two-dimensional rectangular article having dimensions of about 12.7 mm by about 9.5 mm (about 0.5 inch by 0.375 inch) was designed using a CAD software program. The digital information was sent to the Epilog Zing 40 Watt laser engraver and the laser traced the rectangular pattern onto the powder layer, thereby heating the traced region to a temperature adequate to initiate the exothermic chemical reaction. The combined energy from the laser and chemical reaction in the traced region was adequate to produce fusion by sintering and melting of the product materials. The positioning table height was then raised one step corresponding to approximately 200 μm while the press rod position remained stationary. A second layer of the powder mixture was then spread over the first layer by hand and scraped level with the die top using a steel scraping blade. The rectangular article was again traced by the laser to initiate the chemical reaction in this layer. The energy of the laser and chemical reaction caused the traced regions of the second layer to fuse to itself and to the first layer. The process was then repeated layer-by-layer until the complete article with a thickness or height of about 1 mm had been manufactured. The finished article was then removed from the surrounding unreacted powder using forceps.

The product phases of the article were examined by x-ray diffraction and found to be primarily silicon carbide however silicon and carbon peaks were also present. The presence of the residual silicon and carbon is believed to be due to the layer thickness of about 200 μm being too great for the laser processing conditions.

Example 6—WC—Co

An exothermically reactive mixture containing by weight 75.1% tungsten, 4.9% carbon, and 20.0% cobalt was designed to produce a product comprised by weight of 80% tungsten carbide and a 20% matrix of cobalt. The mixture has a calculated adiabatic reaction temperature of 876 Kelvin. A mixture with a total weight of 10 g. was prepared by weighing the constituent powders according to the percentages above. The powders were mixed by shaking followed by hand milling with a mortar and pestle.

An Epilog Zing laser engraver with a 40 Watt carbon dioxide laser was modified to include a steel die having a cylindrical bore of about 25.4 mm (about 1 inch) with the die height positioned by the adjustable height positioning table while the cylindrical press rod passed through a hole in the positioning table to sit flat on the machine base at a fixed height. The Epilog Zing laser engraver was placed inside a controlled atmosphere glove box and the glove box was flooded with argon gas. The positioning table height was adjusted so that there was a gap of about 2 mm between the press rod and the top of the die. A layer of the mixed powders was placed on top of the press rod in the die and the layer of powders was compacted by hand and then scraped flat using a steel plate so the top of the layer was level with the die top.

A two-dimensional square article having dimensions of about 12.7 mm (about 0.5 inch) square was designed using a CAD software program. The digital information was sent to the Epilog Zing 40 Watt laser engraver and the laser traced the square pattern onto the powder layer, thereby heating the traced region to a temperature adequate to initiate the exothermic chemical reaction. The combined energy from the laser and chemical reaction in the traced region was adequate to produce fusion by sintering and melting of the product materials. The positioning table height was then raised one step corresponding to about 200 μm while the press rod position remained stationary. A second layer of the powder mixture was then spread and compacted over the first layer by hand and scraped level with the die top using a steel scraping blade. The square article was again traced by the laser to initiate the chemical reaction in this layer. The energy of the laser and chemical reaction caused the traced regions of the second layer to fuse to itself and to the first layer. The process was then repeated layer-by-layer until the complete article with a height or thickness of about 1 mm had been manufactured. The finished article was then removed from the surrounding unreacted powder using forceps.

The product phases of the articles were examined by x-ray diffraction and found to be primarily tungsten carbide and cobalt, however tungsten and carbon peaks were also present. The presence of the residual tungsten and carbon is believed to be due to the layer thickness of about 200 μm being too great for the laser processing conditions.

Example 7—$TiB_2$—TiC-Glass Matrix

An exothermically reactive mixture containing by weight 50.0% glass powder (approximately 74.5% silica, 13.5% soda, 10.5% lime, 1.5% alumina), 36.1% titanium, and 13.9% boron carbide was designed to produce a product comprised of titanium diboride and titanium carbide in a matrix of 50 percent by weight glass. A mixture with a total weight of 5 grams was prepared by weighing the constituent powders according to the percentages above. The powders were mixed by shaking followed by hand milling with a mortar and pestle.

An Epilog Zing laser engraver with a 40 Watt carbon dioxide laser was modified to include a steel die having a cylindrical bore of about 25.4 mm (about 1 inch) with the die height positioned by the adjustable height positioning table while the cylindrical press rod passed through a hole in the positioning table to sit flat on the machine base at a fixed height. The Epilog Zing laser engraver was placed inside a controlled atmosphere glove box and the glove box was flooded with argon gas. The positioning table height was adjusted so that there was a gap of about 2 mm between the press rod and the top of the die. A layer of the mixed powders was placed on top of the press rod in the die and the layer of powders was compacted by hand and then scraped flat using a steel plate so the top of the layer was level with the die top.

A two-dimensional rectangular article having dimensions of about 12.7 mm by about 9.5 mm (about 0.5 inch by 0.375 inch) was designed using a CAD computer software program. The digital information was sent to the Epilog Zing 40 Watt laser engraver and the laser traced the rectangular pattern onto the powder layer, thereby heating the traced region to a temperature adequate to initiate the exothermic chemical reaction. The combined energy from the laser and chemical reaction in the traced region was adequate to produce fusion by sintering and melting of the product materials. The positioning table height was then raised two steps corresponding to approximately 200 μm while the press rod position remained stationary. A second layer of the powder mixture was then spread and compacted over the first layer by hand and scraped level with the die top using a steel scraping blade. The rectangular article was again traced by the laser to initiate the chemical reaction in this layer. The energy of the laser and chemical reaction caused the traced regions of the second layer to fuse to itself and to the first layer. The process was then repeated layer-by-layer until the complete article with a height or thickness of about 0.8 mm had been manufactured. The finished article was then removed from the surrounding unreacted powder using forceps.

The product phases of the articles were examined by x-ray diffraction and found to contain primarily titanium diboride, titanium carbide, and amorphous material along with lesser amounts of reactant and intermediary phases. The presence of these additional phases is believed to be due to the layer thickness of 200 microns being too great for the laser processing conditions.

Example 8—$B_4C$

An exothermically reactive mixture containing by weight 78.3% boron and 21.7% carbon was designed to produce a product comprised of boron carbide. The mixture has a calculated adiabatic reaction temperature of 957 Kelvin. A mixture with a total weight of 10 g. was prepared by weighing the constituent powders according to the percentages above. The powders were mixed by shaking followed by hand milling with a mortar and pestle.

An Epilog Zing laser engraver with a 40 Watt carbon dioxide laser was modified to include a steel die having a cylindrical bore of about 25.4 mm (about 1 inch) with the die height positioned by the adjustable height positioning table while the cylindrical press rod passed through a hole in the positioning table to sit flat on the machine base at a fixed height. The Epilog Zing laser engraver was placed inside a controlled atmosphere glove box and the glove box was flooded with argon gas. The positioning table height was adjusted so that there was a gap of about 2 mm between the press rod and the top of the die. A layer of the mixed powders was placed on top of the press rod in the die and the layer of powders was compacted by hand and then scraped flat using a steel plate so the top of the layer was level with the die top.

A two-dimensional rectangular article having dimensions of about 12.7 mm by about 9.5 mm (about 0.5 inch by 0.375 inch) was designed using a CAD software program. The digital information was sent to the Epilog Zing 40 Watt laser engraver and the laser traced the rectangular pattern onto the powder layer, thereby heating the traced region to a temperature adequate to initiate the exothermic chemical reaction. The combined energy from the laser and chemical reaction in the traced region was adequate to produce fusion by sintering and melting of the product materials. The positioning table height was then raised two steps corresponding to approximately 400 μm while the press rod position remained stationary. A second layer of the powder mixture was then spread and compacted over the first layer by hand and scraped level with the die top using a steel scraping blade. The rectangular article was again traced by the laser to initiate the chemical reaction in this layer. The energy of the laser and chemical reaction caused the traced regions of the second layer to fuse to itself and to the first layer. The process was then repeated layer-by-layer until the complete article with a height or thickness of about 5.6 millimeters had been manufactured. The finished article was then removed from the surrounding unreacted powder using forceps.

The product phases of the articles were examined by x-ray diffraction and found to contain boron carbide with boron and carbon peaks also present. The presence of the residual boron and carbon is believed to be due to the layer thickness of about 400 µm being too great for the laser processing conditions.

Example 9—B$_4$C—TiB$_2$—SiC Eutectic

An exothermically reactive mixture containing by weight 61.3% boron, 25.1% carbon, 11.1% silicon, and 2.5% titanium was designed to produce a ternary eutectic ceramic product comprised of boron carbide, silicon carbide, and titanium diboride. The mixture has a calculated adiabatic reaction temperature of 1408 Kelvin. A mixture with a total weight of 10 g. was prepared by weighing the constituent powders according to the percentages above. The powders were mixed by shaking followed by hand milling with a mortar and pestle.

An Epilog Zing laser engraver with a 40 Watt carbon dioxide laser was modified to include a steel die having a cylindrical bore of about 25.4 mm (about 1 inch) with the die height positioned by the adjustable height positioning table while the cylindrical press rod passed through a hole in the positioning table to sit flat on the machine base at a fixed height. The Epilog Zing laser engraver was placed inside a controlled atmosphere glove box and the glove box was flooded with argon gas. The positioning table height was adjusted so that there was a gap of about 2 mm between the press rod and the top of the die. A layer of the mixed powders was placed on top of the press rod in the die and the layer of powders was scraped flat by hand using a steel scraping blade so the top of the layer was level with the die top.

A two-dimensional rectangular article having dimensions of about 12.7 mm by about 9.5 mm (about 0.5 inch by 0.375 inch) was designed using a CAD software program. The digital information was sent to the Epilog Zing 40 Watt laser engraver and the laser traced the rectangular pattern onto the powder layer, thereby heating the traced region to a temperature adequate to initiate the exothermic chemical reaction. The combined energy from the laser and chemical reaction in the traced region was adequate to produce fusion by sintering and melting of the product materials. The positioning table height was then raised one step corresponding to approximately 200 µm while the press rod position remained stationary. A second layer of the powder mixture was then spread over the first layer by hand and scraped level with the die top using a steel scraping blade. The rectangular article was again traced by the laser to initiate the chemical reaction in this layer. The energy of the laser and chemical reaction caused the traced regions of the second layer to fuse to itself and to the first layer. The process was then repeated layer-by-layer until the complete article with a height or thickness of about 1.4 mm had been manufactured. The finished article was then removed from the surrounding unreacted powder using forceps.

Example 10—TiC—TiC Diluent

An exothermically reactive mixture containing by weight 40.0% titanium, 10.0% carbon, and 50.0% titanium carbide diluent was designed to produce a product comprised of titanium carbide. The diluent titanium carbide was added to lower the reaction temperature to prevent propagation of the reaction outside of the regions intended to comprise the designed articles. The mixture has a calculated adiabatic reaction temperature of 2076 Kelvin. A mixture with a total weight of 10 g. was prepared by weighing the constituent powders according to the percentages above. The powders were mixed by shaking followed by hand milling with a mortar and pestle.

An Epilog Zing laser engraver with a 40 Watt carbon dioxide laser was modified to house a removable steel die having a cylindrical bore with a diameter of about 25.4 mm (about 1 inch). A layer of the mixed powders was pressed in the die at 1 metric ton-force between two press rods and the upper press rod was pressed out with the compacted powder remaining in the die. The die and compacted powder were placed in the laser engraver and the processing chamber was flooded with argon gas.

A two-dimensional rectangular article having dimensions of about 12.7 mm by about 9.5 mm (about 0.5 inch by 0.375 inch) was designed using a CAD software program. The digital information was sent to the Epilog Zing 40 Watt laser engraver and the laser traced the rectangular pattern onto the powder layer, thereby heating the traced region to a temperature adequate to initiate the exothermic chemical reaction. The combined energy from the laser and chemical reaction in the traced region was adequate to produce fusion by sintering and melting of the product materials. Additional mixed powder totaling 0.1 g. was added on top of the first layer and again compacted using one metric ton-force and the die and compacted powder was placed in the laser engraver. The processing chamber was again flooded with argon gas and the rectangular article was again traced by the laser to initiate the chemical reaction in this layer. The energy of the laser and chemical reaction caused the traced regions of the second layer to fuse to itself and to the first layer. The finished article was then removed from the surrounding unreacted powder using forceps.

The product phases of the articles were examined by x-ray diffraction and found to contain primarily titanium carbide with lesser amounts of titanium and carbon also present. The presence of the residual boron and carbon is believed to be due to incomplete removal of surrounding powders and due to the layer height being too high for the laser processing conditions.

Example 11—Ti—TiN

A powder containing by weight 100% titanium was designed to exothermically react with nitrogen gas in an atmosphere comprised of 90% argon and 10% nitrogen gases at a pressure of one atmosphere to produce a product comprised of titanium nitride and titanium metal.

An Epilog Zing laser engraver with a 40 Watt carbon dioxide laser was modified to include a steel die having a cylindrical bore of about 25.4 mm (about 1 inch) with the die height positioned by the adjustable height positioning table while the cylindrical press rod passed through a hole in the positioning table to sit flat on the machine base at a fixed height. The Epilog Zing laser engraver was placed inside a controlled atmosphere glove box and the glove box was flooded with the mixture of argon and nitrogen gases. The positioning table height was adjusted so that there was a gap of about 2 mm between the press rod and the top of the die. A layer of the mixed powders was placed on top of the press rod in the die and the layer of powders was scraped flat by hand using a steel scraping blade so the top of the layer was level with the die top.

A two-dimensional rectangular article having dimensions of about 12.7 mm by about 9.5 mm (about 0.5 inch by 0.375 inch) was designed using a CAD software program. The digital information was sent to the Epilog Zing 40 Watt laser engraver and the laser traced the rectangular pattern onto the powder layer, thereby heating the traced region to a temperature adequate to initiate the exothermic chemical reaction with the nitrogen gas. The rate and extent of the reaction was kinetically limited by the availability of nitrogen. The combined energy from the laser and chemical reaction in the traced region was adequate to produce fusion by sintering and melting of the product materials. The positioning table height was then raised one step corresponding to approximately 200 µm while the press rod position remained stationary. A second layer of the powder mixture was then spread over the first layer by hand and scraped level with the die top using a steel scraping blade. The rectangular article was again traced by the laser to initiate the chemical reaction in this layer. The energy of the laser and chemical reaction caused the traced regions of the second layer to fuse to itself and to the first layer. The process was then repeated layer-by-layer until the complete article with a height or thickness of about 1 mm had been manufactured. The finished article was then removed from the surrounding unreacted powder using forceps.

The product was found to have a gold color characteristic of titanium nitride and also contain unreacted titanium metal. The amount of product phase converted to titanium nitride can be increased by increasing the nitrogen concentration and pressure as well as by decreasing the titanium particle size and layer thickness.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A method of producing an article, comprising:
providing a first material in powder form;
providing a second material in powder form, the second material capable of chemically reacting with the first material to form a reaction product;
providing a diluent material, the diluent material being added to controllably reduce an extent of propagation of the chemical reaction between the first and second materials;
forming the first, second, and diluent materials into a first layer;
subjecting a portion of the first layer to energy sufficient to initiate the chemical reaction between the first and second materials to form a portion of the article, the portion of the article comprising the reaction product;
forming a second layer of the first, second, and diluent materials on the first layer; and
subjecting a portion of the second layer to the energy to form an additional portion of the article.

2. The method of claim 1, wherein said subjecting the portion of the first layer to the energy comprises subjecting the portion of the first layer to directed energy, and wherein said subjecting the portion of the second layer to the energy comprises subjecting the portion of the second layer to the directed energy.

3. The method of claim 1, wherein said subjecting the portion of the first layer to the energy comprises subjecting the portion of the first layer to localized energy, and wherein said subjecting the portion of the second layer to the energy comprises subjecting the portion of the second layer to the localized energy.

4. The method of claim 1, further comprising blending the first, second, and diluent materials to form a blended material, the blended material comprising a substantially homogeneous mixture of the first, second, and diluent materials, and wherein said forming the first and second layers comprises forming the first and second layers from the blended material.

5. The method of claim 4, wherein said forming the first and second layers from the blended material comprises compacting the blended material to form the first and second layers.

6. The method of claim 4, further comprising combining the blended material with a third material to form a blended paste, the blended paste comprising a substantially homogeneous mixture of the first, second, diluent, and third materials, and wherein said forming the first and second layers from the blended material comprises extruding the blended paste to form the first and second layers.

7. The method of claim 6, wherein the third material comprises a liquid.

8. The method of claim 6, wherein the third material comprises a binder.

9. The method of claim 2, wherein said subjecting the first and second layers to directed energy comprises directing a laser beam on the first and second layers.

10. The method of claim 9, wherein said directing a laser beam on the first and second layers comprises directing the laser beam having a wavelength in an infrared wavelength range.

11. The method of claim 2, wherein said subjecting the first and second layers to directed energy comprises directing an electron beam on the first and second layers.

12. The method of claim 2, wherein said subjecting the first and second layers to directed energy comprises subjecting the first and second layers to an electric plasma arc.

13. The method of claim 1, wherein said forming and subjecting steps are conducted in an inert atmosphere.

14. The method of claim 1, further comprising:
providing a supply of a process gas, the process gas capable of chemically reacting with at least one of the first and second materials; and
wherein said forming and subjecting steps are conducted in an atmosphere comprising the process gas so that the process gas chemically reacts with at least one of the first and second materials.

15. The method of claim 14, wherein the process gas comprises nitrogen gas.

16. The method of claim 1, further comprising subjecting the article to post-formation energy to react unreacted material remaining in the article.

17. The method of claim 16, wherein said subjecting the article to post-formation energy comprises heating the article in a furnace to react unreacted material remaining in the article.

18. A method of producing an article, consisting essentially of:
(a) providing a first material;
(b) providing a supply of a process gas, the process gas capable of chemically reacting with the first material to form a reaction product;
(c) providing a diluent material, the diluent material being added to controllably limit a propagation of the chemical reaction between the first material and the process gas;
(d) forming the first material and diluent material into a first layer;
(e) subjecting a portion of the first layer to energy in the presence of the process gas, the energy being sufficient to initiate the chemical reaction between the first material and the process gas to form a first portion of the article, the first portion of the article consisting essentially of the reaction product;

(f) forming a second layer of the first material on the first layer; and (g) subjecting a portion of the second layer to the energy in the presence of the process gas to form an additional portion of the article, the additional portion of the article consisting essentially of the reaction product; and (h) repeating steps (f) and (g) until the article is formed in its entirety, the article consisting essentially of the reaction product.

19. A method of producing an article, comprising:

providing a first material in powder form;

providing a second material in powder form, the second material capable of chemically reacting with the first material upon the addition of energy to form a reaction product;

selecting a diluent material based on said first and second materials;

providing the diluent material in an amount sufficient to controllably reduce one or more of a reaction rate, a reaction temperature, a propagation rate, and an extent of a propagation of the chemical reaction between the first and second materials;

forming the first, second, and diluent materials into a first layer;

subjecting a portion of the first layer to energy sufficient to initiate the chemical reaction between the first and second materials to form a portion of the article, the portion of the article comprising the reaction product;

forming a second layer of the first, second, and diluent materials on the first layer; and subjecting a portion of the second layer to the energy to form an additional portion of the article.

* * * * *